United States Patent
Powell et al.

(10) Patent No.: US 7,336,907 B2
(45) Date of Patent: Feb. 26, 2008

(54) OPTICAL ASSEMBLY HAVING CYLINDRICAL LENSES AND RELATED METHOD OF MODULATING OPTICAL SIGNALS

(75) Inventors: Donald A. Powell, Dallas, TX (US); Terry A. Bartlett, Dallas, TX (US); Bryce Sawyers, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 695 days.

(21) Appl. No.: 10/699,472

(22) Filed: Oct. 31, 2003

(65) Prior Publication Data
US 2005/0095009 A1     May 5, 2005

(51) Int. Cl.
*H04B 10/04* (2006.01)
(52) U.S. Cl. ..................................... 398/201
(58) Field of Classification Search ............... 398/183, 398/200, 201; 359/298, 619, 366, 707, 710
See application file for complete search history.

(56) References Cited

U.S. PATENT DOCUMENTS

| | | | |
|---|---|---|---|
| 6,002,101 A * | 12/1999 | Yamazaki et al. | 219/121.75 |
| 6,337,935 B1 * | 1/2002 | Ford et al. | 385/24 |
| 7,162,115 B2 * | 1/2007 | Brophy et al. | 385/16 |
| 2004/0008401 A1 * | 1/2004 | Szczepanek et al. | 359/290 |
| 2004/0156581 A1 * | 8/2004 | Golub et al. | 385/18 |
| 2005/0036202 A1 * | 2/2005 | Cohen et al. | 359/495 |

* cited by examiner

*Primary Examiner*—Leslie Pascal
(74) *Attorney, Agent, or Firm*—Wade James Brady, III; Frederick J. Telecky, Jr.

(57) ABSTRACT

Described embodiments provide for an optical communications assembly or other optical assembly in which the post-dispersion optical signals are controlled in dispersive and non-dispersive directions. In one embodiment, the assembly includes an optical signal collimator configured to emit an optical signal based on an input communication signal. In addition, the assembly includes a dispersive device that receives the optical signal and disperses multiple wavelength channels of the optical signal in a dispersive direction. The assembly further includes a first light-directing device configured to control the dispersion of the multiple wavelength channels in the non-dispersive direction. A second light-directing device is provided to control dispersion in the dispersive direction. Specifically, the first and second light-directing devices focus the multiple wavelength channels in the dispersive and non-dispersive directions so as to make the multiple wavelength channels either propagate in parallel or re-converge or diverge at a different rate in both directions. By controlling the multiple channel wavelengths through the use of the light-directing devices, the spot sizes and shapes of the channels projected onto a light modulating device can be controlled. Related methods of such modulating are also disclosed.

27 Claims, 2 Drawing Sheets

US 7,336,907 B2

OPTICAL ASSEMBLY HAVING CYLINDRICAL LENSES AND RELATED METHOD OF MODULATING OPTICAL SIGNALS

TECHNICAL FIELD OF THE INVENTION

Disclosed embodiments herein relate generally to microelectromechanical systems (MEMS) assemblies, and, more specifically, to optical communication assemblies employing dispersion of wavelength components of optical signals along at least one axis for shaping optical signals relative to both dispersive and non-dispersive axes of the optical signals.

BACKGROUND OF THE INVENTION

Optoelectronic devices have continued to gain popularity with today's top manufacturers. Specifically, microelectromechanical devices, such as actuators, motors, sensors, and microelectromechanical systems (MEMS), such as spatial light modulators (SLMs), are some of the few types of optoelectronic devices gaining in use. Such packaged SLMs and other types of MEMS devices are employable in digital micromirror device (DMD) technology, of the type designed and used by Texas Instruments of Dallas, Tex. DMD technology, or similar technology, is then employed in optical communication systems for the transmission of data via optical signals.

DMD MEMS assemblies include arrays of electronically addressable mirror elements (or "pixels"), which are selectively movable or deflectable. The mirror elements are individually movable in response to electrostatic forces from an integrated addressing circuit formed in a semiconductor substrate beneath the mirror elements. Such MEMS assemblies may be used to modulate incident light in a spatial pattern or to otherwise modulate the incident light or components thereof in phase, intensity, polarization or direction.

In wavelength division multiplexing (WDM) and dense wavelength division multiplexing (DWDM) applications, dynamic gain equalizers (DGEs) are typically employed to equalize and condition each carrier wavelength or channel in an optical signal for data to be transmitted reliably. In WDM, DWDM, DGE, and many other optical telecommunications applications, as well as in other non-telecommunications contexts, the incoming optical signal may be dispersed into multiple optical wavelength components. A typical way to disperse the wavelengths is through a diffraction grating along a single axis. After diffraction, the multiple wavelengths will continue to disperse along the dispersive axis until a lens or other optical component is used to control the dispersion. The now-separated wavelengths will then form multiple gaussian spots across the surface of the DMD or other SLM used to re-establish substantially parallel or re-converging paths for the multiple wavelengths. Groups of pixels may then be turned on or off to separately modulate the wavelength signals. However, in many systems, many available mirrors are not employed, since the incoming signal cannot reach them, resulting in lost overall resolution. In addition, the tendency of the mirror array in the SLM to behave like a grating may result in signal loss through a decrease in coupling efficiency of modulated output signals from the SLM.

BRIEF SUMMARY OF THE INVENTION

Described embodiments provide for an optical communications assembly or other optical assembly in which the post-dispersion optical signals are controlled in dispersive and non-dispersive directions. In one embodiment, the assembly includes an optical signal collimator configured to emit an optical signal based on an input communication signal. In addition, the assembly includes a dispersive device that receives the optical signal and disperses multiple wavelength channels of the optical signal in a dispersive direction. The assembly further includes a first light-directing device configured to control the dispersion of the multiple wavelength channels in the non-dispersive direction. A second light-directing device is provided to control dispersion in the dispersive direction. Specifically, the first and second light-directing devices focus the multiple wavelength channels in the dispersive and non-dispersive directions so as to make the multiple wavelength channels either propagate in parallel or re-converge or diverge at a different rate in both directions. By controlling the multiple channel wavelengths through the use of the light-directing devices, the spot sizes and shapes of the channels projected onto a light modulating device can be controlled. Related methods of such modulating are also disclosed.

In addition, mirror arrays in light modulating devices, such as a spatial light modulators (SLM), are employed to modulate or "switch" all or a percentage of the signal of one or more wavelengths. However, the periodicity of the mirror array in SLMs can cause unwanted dispersion of some or all of the wavelengths being modulating. This dispersion during modulation typically affects the collection of the output optical signals received from the array. If left uncorrected, a decrease in coupling efficiency of output signals typically results. Thus, the embodiments disclosed may also be adjusted to compensate for the dispersive effect on the modulated signals imparted by the optical mirror array.

BRIEF DESCRIPTION OF THE DRAWINGS

For a more complete understanding, reference is now made to the following detailed description taken in conjunction with the accompanying drawings. It is emphasized that various features may not be drawn to scale. In fact, the dimensions of various features may be arbitrarily increased or reduced for clarity of discussion. Reference is now made to the following descriptions taken in conjunction with the accompanying drawings, in which.

DETAILED DESCRIPTION OF THE INVENTION

Figure 1:
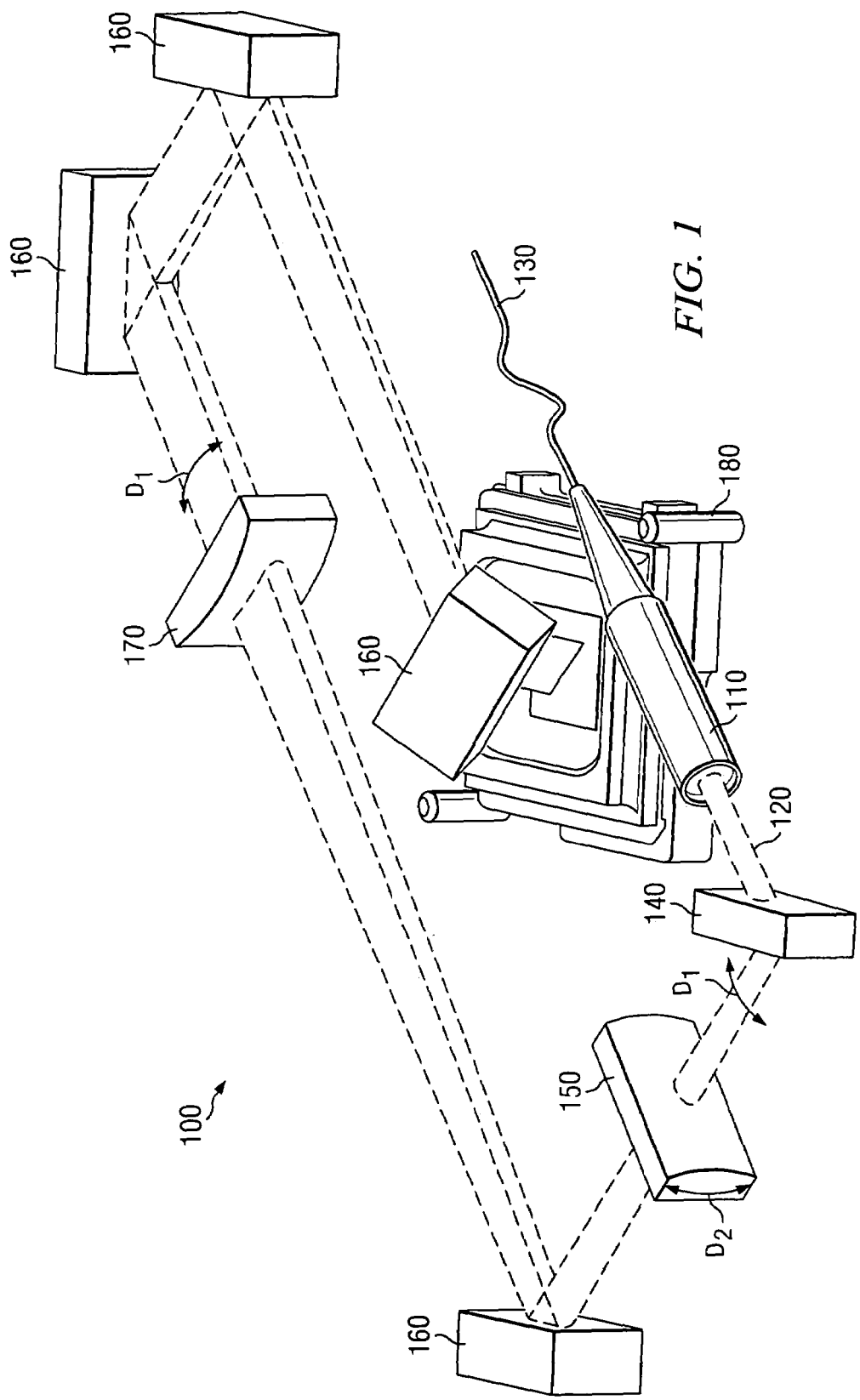
FIG. 1 illustrates an isometric view of an optical communication assembly incorporating the principles disclosed herein.

Referring initially to FIG. 1, illustrated is an isometric view of an optical communication assembly 100 incorporating the principles disclosed herein. The assembly 100 may be employed in any type of optical communication system or fiber optic system, such as those used in WDM and DWDM applications. More specifically, the assembly 100 may be a dynamic gain equalizer (DGE) in a larger optical communication system for use in the attenuation and modulation of optical data signals using spatial light modulators (SLMs).

As illustrated, the assembly 100 includes an optical signal collimator 110. The collimator 110 is configured to emit an optical signal 120 comprised of a plurality of optical channels based on an input communication signal 130. In such embodiments, the channels of the optical signal 120 are defined in terms of optical wavelength (λ). In addition, the input signal 130 may also be provided to the collimator 110 by a circulator (not illustrated). The circulator also may be configured to receive output signals from the collimator 110. The circulator may be included within the DGE assembly 100, or positioned outside of it.

The assembly 100 also includes a dispersive device in the form of a channel separation device 140. In a more specific embodiment, the channel separation device 140 is an optical wavelength grating configured to impart spatial separation between the channels within the optical signal 120 in a dispersive direction $D_1$. In addition, the channel separation device 140 may be a reflective grating or a transmissive grating; a transmissive grating is shown in the illustrated embodiment.

In one embodiment, the optical signal 120 may include as many as 88 separate channels or more, although the assembly 100 is not limited to any particular number of channels. The channels are defined and spatially separated based on specific individual ranges of wavelengths of light ($\lambda_1$, $\lambda_2$, ... $\lambda_n$) for each carrier frequency representing each channel found in the optical signal 120. The overall range of wavelengths for the entire optical signal 120 may range, for example, from about 1528 nm to about 1610 nm (i.e., the "C-band"). Of course, other ranges of wavelengths or telecommunications bands may be used for spatial separation of the optical signal 120 into distinct channels.

Once the optical signal 120 has been spatially separated into distinct channels, the signal 120 passes through a first light-directing device, illustrated is a first lens 150, which will be discussed in greater detail below. The signal then impacts a first of a plurality of fold mirrors 160. The impacted fold mirror 160 reflects the optical signal 120, redirecting it to a second light-directing device, illustrated as a second lens 170. As illustrated, the second lens 170 has a cylindrical convex curvature in the dispersive direction $D_1$. Although cylindrical lenses are illustrated in FIG. 1, it should be understood that any type of reflective or refractive device may be used in place of the light-directing devices (e.g., lenses), such as cylindrical mirrors. In such an embodiment, one or more of the fold mirrors 160 may be replaced with reflective devices, such as cylindrical mirrors, to take the place of the lenses 150, 170. In addition, the curvature of any of the light-directing devices may be located in more than place. Thus, as used herein, the term "cylindrical" with respect to the curvatures of light-directing devices employed in the assembly 100 refers to those light-directing devices having optical power in only one direction, and is not limited to devices having curvature on only one side or in only one direction.

With a curvature in the dispersive direction $D_1$, the second lens 170 (or other light-directing device, as the case may be) is configured to refract or otherwise direct channels of the optical signal 120 in the dispersive direction $D_1$, as illustrated. More specifically, as the channel separation device 140 spatially separates the optical signal 120 into the distinct channels mentioned above, the grating of the device 140 also causes the individual channels to begin to diverge in the dispersive direction $D_1$. Thus, as the diverging optical signal 120 travels from the channel separation device 140 to the second lens 170, the signal 120 continues to diverge, as is illustrated by the widening of the optical signal 120 in the dispersive direction $D_1$.

Since the second lens 170 has a cylindrical curvature in the dispersive direction $D_1$ and since the optical signal 120 impacts the convex curvature of the second lens 170 before passing therethrough, the lens 170 refracts the diverging optical signal 120 as the signal 120 passes therethrough. More specifically, after passing through the second lens 170, diverging of the optical signal 120 is curtailed through the refracting/focusing of the second lens 170, and the signal 120 is reflected by two more fold mirrors 160, before being redirected into an SLM 180 by a fourth fold mirror 160. Although the use of fold mirrors 160 is not required, and are employed in the illustrated embodiment to allow a more compact optical assembly 100 to be constructed.

By focusing the optical signal 120 with the second lens 170, each individual channel within the signal 120 may be projected as an independent optical spot onto a MEMS mirror array (not illustrated) within the SLM 180 for optical processing through the reflection of individual channels in the signal 120 with the mirrors of the MEMS array. In addition, the position and focal length of the second lens 170 may be selected such that the optical signal 120 is expanded in the dispersive direction $D_1$ when projected onto the mirrors of the MEMS array, for example, if the dispersion provided by the device 140 is insufficient for the specific mirror array employed in the SLM 180. As a result, the specific width of the optical signal 120 in the dispersive direction $D_1$ may be selected, and thus focused, so as to employ the most efficient number of MEMS mirrors available in the dispersive direction during the optical processing, as desired. Of course, by employing more mirrors during optical processing, the resolution of the optical output signal of the SLM 180 may be increased.

However, due to the refractive properties of the second lens 170 in only the dispersive direction $D_1$, refraction of the optical signal 120 in the non-dispersive direction $D_2$ cannot be controlled with the second lens 170 alone. As a result, the first lens 150 mentioned above is provided, which has a cylindrical convex curvature in the non-dispersive direction $D_2$ for refracting channels of the optical signal 120 in the non-dispersive direction $D_2$. Although the optical signal 120 is refracted in the non-dispersive direction $D_2$ by the first lens 150, the signal 120 is not refracted in the non-dispersive direction $D_2$ by the second lens 170, since the second lens 170 has its curvature in the dispersive direction $D_1$, which is perpendicular to the non-dispersive direction $D_2$. Thus, the position and focal length of the first lens 150 may be selected so as to shape the optical signal 120 in order to maximize the number of mirrors available on the MEMS array used during optical processing of the optical signal 120, without unnecessarily overlapping the optical signal 120 in the dispersive direction $D_1$. The focusing of the optical signal 120 in both the dispersive and non-dispersive directions $D_1$, $D_2$ in order to project a specifically shaped spot that maximizes the number of mirrors on the MEMS array in the SLM 180 that can be used is discussed in further detail with reference to FIG. 2.

Although shaping the optical signal 120 in order to project onto a greater number of mirrors during processing typically results in increased resolution of the output from the SLM 180, the shaping of the optical signal 120 in both directions $D_1$, $D_2$ is limited both by the number of available mirrors for processing the signal 120, as well as the width of the output signal in those directions $D_1$, $D_2$. More specifically, to provide correction of much of the dispersion that occurs from the reflections within the SLM 180, the refractive properties of the second lens 170 allow it to capture most of the output signal and refract the portions of the signal in the dispersive direction $D_1$, thus correcting much of the undesired dispersion imparted by grating properties of the MEMS mirror array.

However, since the second lens 170 only has a cylindrical curvature in the dispersive direction $D_1$, the second lens 170 does not refract the output signal in the non-dispersive direction $D_2$. Instead, such correction is provided by the first lens 150. Since the first lens 150 has a cylindrical convex curvature in the non-dispersive direction $D_2$ for refracting channels of the optical signal 120 in the non-dispersive direction $D_2$, rather than in the dispersive direction $D_1$, the first lens 150 is capable of providing correction in the non-dispersive direction $D_2$. More specifically, the shape of the first lens 150 allows it to capture most of the output signal and refract the portions of the signal in the non-dispersive direction $D_2$, thus further correcting some of the undesired dispersion imparted by the MEMS mirror array. By providing such correction in both the dispersive and non-dispersive directions $D_1$, $D_2$, more of the "re-converged" output signal may be captured, resulting in less signal lost from the output of the SLM 180.

In the illustrated embodiment of FIG. 1, the assembly 100 includes the first lens 150 positioned between the optical signal collimator 110 and the second lens 170. By positioning the first lens 150 as such, the focal length of the first lens 150, as well as its position with respect to the collimator 110, may be selected so as to focus the optical signal 120 in the non-dispersive direction $D_2$ before it reaches the second lens 170. As discussed above, the grating 140 typically only causes the optical signal 120 to disperse in the dispersive direction $D_1$. This dispersion, when combined with the refraction in the dispersive direction $D_1$ imparted by the second lens 170, results in the projection of a spot onto the MEMS mirror array having a selected diameter in the dispersive direction $D_1$ such that the spots for each channel do not excessively overlap (see FIG. 2). However, since neither the grating 140 nor the second lens 170 causes refraction in the non-dispersive direction $D_2$, which is perpendicular to the dispersive direction $D_1$, the first lens 150 is employed, as described above.

By focusing the optical signal 120 in the non-dispersive direction $D_2$, the projection of the optical signal 120 onto the MEMS array of the SLM 180 is now specifically shaped in the non-dispersive direction $D_2$ so as to employ more mirrors on the array during processing than used with a spherical lens. Moreover, because the second lens 170 only has its curvature in the non-dispersive direction $D_2$, it does not affect any focusing of the optical signal 120 provided by the first lens 150. In a specific embodiment, the second lens 170 is positioned at the focal length of the first lens 150 to provide the desired shaping in the non-dispersive direction $D_2$, however, an assembly according to the principles disclosed herein is not so limited. Furthermore, the focal length of the first lens 150 may also be selected to shape the spot in the non-dispersive direction $D_1$ so as to maximize mirror utilization on the array. By maximizing the number of mirrors used on the array, better resolution and control of the optical signals may be had.

Figure 2:
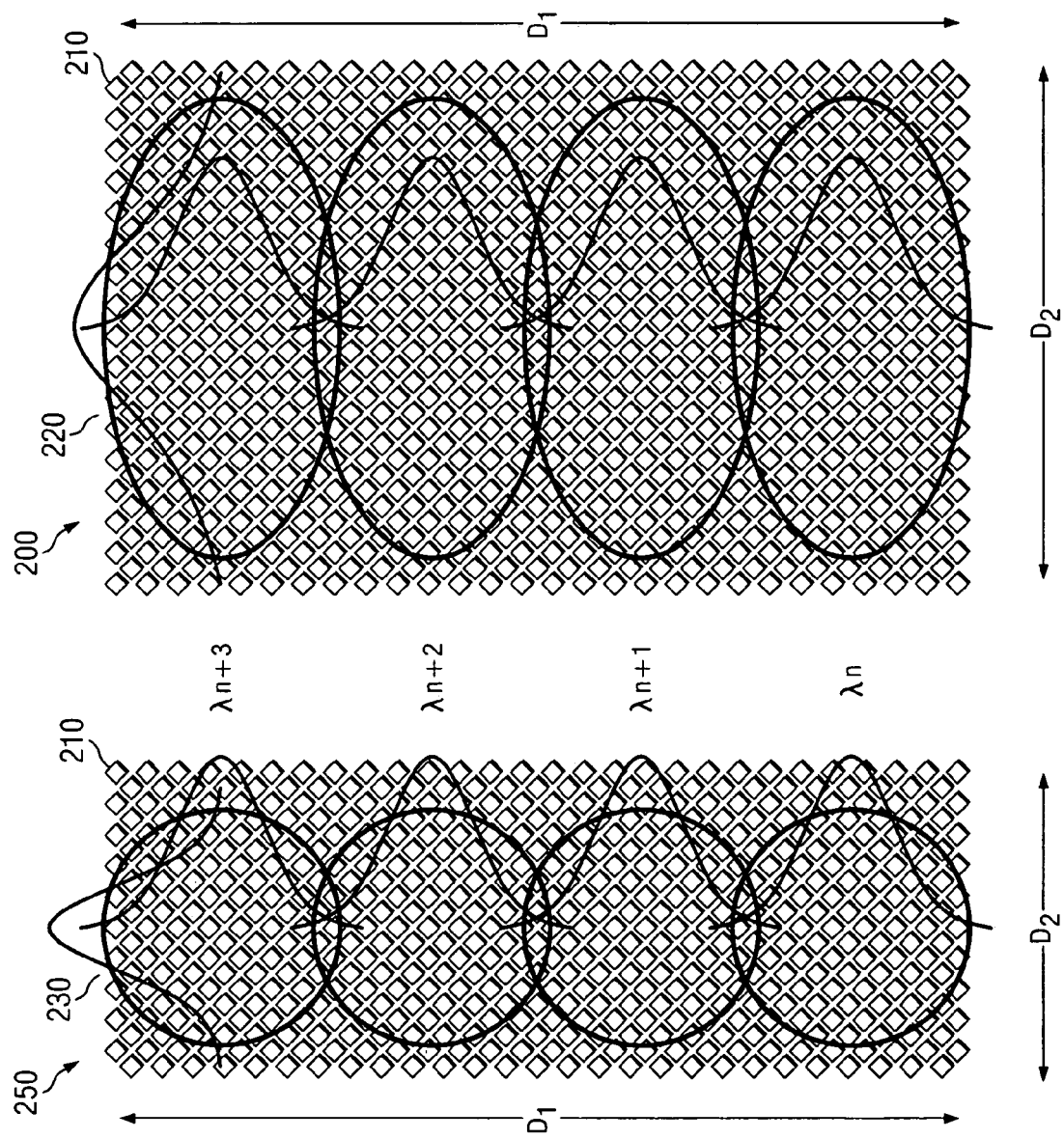
FIG. 2 illustrates a view of a conventional projection along side a view of a novel projection created using an assembly, and related method, as disclosed herein.

Turning now to FIG. 2, illustrated is a view of a conventional projection 250 along side a view of a novel projection 200 created using an assembly, and related method, as disclosed above. More specifically, FIG. 2 shows a plan view of a comparison between conventional optical signal spots 230 on a MEMS mirror array 210, and spots 220 projected by an assembly constructed according to the principles disclosed herein. The conventional projection 250 is generated using a conventional system employing a spherical lens for attenuation and collection of an optical signal.

As discussed in greater detail with reference to FIG. 1, the proposed assembly and method employs two cylindrical optical elements, rather than the conventional spherical optics, to individually shape the optical signal into gaussian spots 220 in both the dispersive direction $D_1$ and the non-dispersive direction $D_2$ for projection at the SLM. As shown, in the dispersive direction $D_1$, the array of wavelengths ($\lambda n$, $\lambda n+1$, $\lambda n+2$, $\lambda n+3$, . . . ) occupy all of the available area on the mirror array 210 in that direction. Thus, no further mirrors in the dispersive direction $D_1$ of the spot are available to each projected spot 230, without excessive overlap. In conventional systems employing such spherical optics, equation (1) sets forth a first order assessment of the diameter of the conventional spots 230 ($d_s$) in both the dispersive and non-dispersive directions $D_1$, $D_2$:

$$d_s = \frac{4\lambda f}{\pi d_c} \quad (1)$$

where $\lambda$ is the wavelength of each of channel ($\lambda n$, $\lambda n+1$, $\lambda n+2$, $\lambda n+3$, . . . ), f is the focal length of the conventional spherical lens employed, and dc is the diameter of the collimator.

since no more expansion of the spots 220, 230 is available in the dispersive direction $D_1$, the proposed assembly and method stretch the beam spot 220 in the non-dispersive direction $D_2$, while maintaining the spot 220 diameter in the dispersive direction $D_1$. Consequently, more mirrors on the array 210 become available to manipulate the magnitude and phase of each wavelength channel of the optical signal. Thus, equation (2) sets forth a first order assessment of the diameter of the spots 220 in the dispersive direction $D_1$ ($d_{s-d}$), while equation (3) sets forth a first order assessment of the diameter of the spots 220 in the non-dispersive direction $D_2$ ($d_{s-nd}$).

$$d_{s-d} = \frac{4\lambda f_2}{\pi d_c} \quad (2)$$

$$d_{s-nd} = \frac{4\lambda f_1}{\pi d_c} \quad (3)$$

where $\lambda$ is the wavelength of each of channel ($\lambda n$, $\lambda n+1$, $\lambda n+2$, $\lambda n+3$, . . . ), $f_2$ is the f length of the cylindrical lens having curvature in the dispersive direction $D_1$ (positioned closest to the SLM, e.g., the second lens 170), $f_1$ is the focal length of the cylindrical lens having curvature in the non-dispersive direction $D_2$ (e.g., the first lens 150), and $d_c$ is the diameter of the collimator.

In typical conventional approaches, the system's 250 input beam and output beam travel through the same set of spherical optical elements, for example, in a so-called "cat's eye" configuration. One of the key attributes of this configuration is that it is typically more stable than a system that is in collimated space. More specifically, most misalignments of the optical signal from environmental conditions (e.g., vibration, temperature, etc.) or during assembly are self-corrected during the beam's return path through the same set of spherical optical elements. This is possible since spherical lens include curvature in both the dispersive and non-dispersive directions $D_1$, $D_2$. Unfortunately, however, because spherical lenses contain the same curvature in both directions $D_1$, $D_2$, the diameter of each spot 230 remains constant in all directions (e.g., see equation (1)). This is the case since spherical lenses, even when multiple spherical lenses are employed in a single assembly, do not allow separate individual control of beam dispersion (during its input path) and correction (during its return path) in both the dispersive and non-dispersive directions $D_1$, $D_2$.

Thus, the principles disclosed herein provide a system with improved capability for attenuating and/or conditioning (e.g., dispersion correction) each wavelength channel of an optical data signal at the sLM, while still increasing overall resolution of the optical signal through an increased number of mirrors reached and modulated by the specially shaped optical signal. Thus, in the proposed assembly and method, the stability of the system 200 is preserved, similar to conventional spherical optics, while creating a larger spot size in the non-dispersive direction $D_2$ using separate cylindrical lenses. The separate lenses provide signal focusing individually in the dispersive and non-dispersive directions $D_1$, $D_2$ so that a greater number of mirrors on the MEMS array may be employed for signal modulation without detrimentally overlapping the projected spots with adjacent channels. By increasing the number of mirrors available for modulation, an increase in signal resolution may be obtained.

Moreover, most, if not all, of the signal reflections from the mirror array 210 may be collected on the optical signal's return path since the separate cylindrical lenses provide individual correction of dispersion from the array 210 in both of the directions $D_1$, $D_2$ (using each cylindrical lens individually). Hence, the principles disclosed herein result in assemblies and methods that are spatially efficient and can compensate for SLM dispersion, which leads to higher coupling efficiency, while yielding a system that has better resolution and a high degree of stability when compared to systems employing conventional approaches.

In addition, depending on the application, the sLM may be positioned, and the first and second lenses adjusted, with respect to the incoming optical signal, so as to provide improved coupling efficiency of output signals. specifically, such adjustments in the assembly disclosed herein may be made to increase the number of channels that impact the mirror array in the SLM at or near the "Littrow condition." In the Littrow condition, the angle of incidence of an incoming optical signal on a mirror in a mirror array equals the angle of defraction from the same mirror. Thus, when optical signals are modulated at the Littrow condition, the channels coming in on a first path will be defracted back along that same path, although traveling in the opposite different direction. However, because the mirror arrays within SLMs typically impart at least some dispersive effect on an incoming optical signal, as mentioned above, the channels of an incoming signal are not reflected in the Littrow condition. Moreover, typically the larger the wavelength of channel to be modulated, the greater the dispersion caused by the grading affect of the mirror array. Thus, depending on the amount of dispersion imparted by the SLM, some or all of certain channels are not collected during the return path of the modulated signal.

To combat this decrease in coupling efficiency of the output signals, the optical assembly herein may be adjusted such that the more central channels within the overall wavelength of the incoming signal impact the mirror array at or near the Littrow condition. Unfortunately, since focusing the spots on the mirrors typically results in the bundles of light within each channel converging, the chance for modulation near the Littrow condition decreases when moving towards the outer channels, e.g., as wavelength increases. Furthermore, the incoming angle of the overall incoming signal into the SLM can affect how close to the Littrow condition modulation for certain channels can occur. specifically, when the optical signal does not impact the mirror array at the normal (e.g., the signal approaches the array at an angle from one side, which may be the Littrow condition angle), one side of the signal will hit the array before the opposite side of the signal will. This delay in impact then results in delay being introduced into the output signals of the channels having to travel further before contacting the mirror.

Thus, as briefly introduced above, an added benefit to optical assemblies constructed according to the principles disclosed herein is the ability to adjust the position of the SLM with respect to the specifically shaped incoming optical signal provided herein. specifically, fold mirrors closest to the SLM may be positioned so that the incoming optical signal is reflected for projection onto the mirror array at a desired angle. since the gaussian spots provided herein are stretched in the non-dispersive direction $D_2$ to reach more mirrors, the orientation of the SLM should be adjusted so the incoming channel in the non-dispersive direction impact the mirror array as close to each other as possible. With such an adjustment, if the incoming signal does impact the mirror array at a non-normal angle (which is typically the case), the delay across the channels is spread in the dispersive direction, where the diameter of each spot is smaller. Those who are skilled in the pertinent field of art are capable of determining the proper orientation of the sLM with respect to the incoming optical signal, as well as any of the fold mirrors employed in the system. By adjusting these items, more channels may enter the SLM at the Littrow condition angle, resulting in increased coupling efficiency of the output signals.

To further combat the problems associated with reaching the Littrow condition across the incoming signal, the first and second lenses 150, 170 may not have uniform curvatures across their respective surfaces. By specially designing the curvature of the lenses employed in the assembly, the focusing of the individual channels provided by the lenses may also then impart greater or lesser refraction on certain channels creating the ability to independently tune the angle of incidence of each separate channel on the mirror array. Consequently, even higher coupling efficiency may be achieved with the approach proposed herein, along with the increase in overall signal resolution. Of course, coupling efficiency becomes even more critical as the overall size of the optical assemblies decreases, since a corresponding decrease in collimator size follows.

While various embodiments of an assembly, and related methods, constructed according to the principles disclosed herein, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are effected in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. specifically and by way of example, although the headings refer to a "Technical Field of the Invention," the claims should not be limited by the language chosen under this heading to describe the so-called field of the invention. Further, a description of a technology in the "Background of the Invention" is not to be construed as an admission that technology is prior art to any invention(s) in this disclosure. Neither is the "Brief summary of the Invention" to be considered as a characterization of the invention(s) set forth in the claims set forth herein. Furthermore, the reference in these headings, or elsewhere in this disclosure, to "invention" in the singular should not be used to argue that there is only a single point of novelty claimed in this disclosure. Multiple inventions may be set forth according to the limitations of the multiple claims associated with this disclosure, and the claims accordingly define the invention(s) that are protected thereby. In all instances, the scope of the claims shall be considered on their own merits in light of the specification, but should not be constrained by the headings set forth herein.

What is claimed is:

1. An optical communication assembly, comprising:
   an optical signal collimator configured to emit an optical signal based on an input communication signal;
   a dispersive device configured to receive the optical signal and to disperse multiple wavelength channels of the optical signal in a dispersive direction;
   a first light-directing device configured to focus the multiple wavelength channels in a non-dispersive direction for projection onto a light modulating device; and
   a second light-directing device configured to focus the multiple wavelength channels in the dispersive direction for projection onto the light modulating device.

2. An optical communication assembly according to claim 1, wherein the optical communication assembly is a dynamic gain equalizer and the light modulating device includes a MEMs mirror array.

3. An optical communication assembly according to claim 1, wherein the multiple wavelength channels range from about 1528 nm to about 1610 nm.

4. An optical communication assembly according to claim 1, wherein the first and second light-directing devices are first and second refractive devices.

5. An optical communication assembly according to claim 4, wherein the first refractive device is a first lens comprising a cylindrical convex curvature in the non-dispersive direction, and the second refractive device is a second lens comprising a cylindrical convex curvature in the dispersive direction.

6. An optical communication assembly according to claim 5, wherein the first lens is positioned between the optical signal collimator and the second lens.

7. An optical communication assembly according to claim 6, wherein the second lens is positioned at a focal length of the first lens.

8. An optical communication assembly according to claim 1, wherein the first and second light-directing devices are first and second reflective devices.

9. An optical communication assembly according to claim 8, wherein the first reflective device is a first mirror comprising a cylindrical convex curvature in the non-dispersive direction, and the second reflective device is a second mirror comprising a cylindrical convex curvature in the dispersive direction.

10. An optical communication assembly according to claim 9, wherein the second mirror is positioned at a focal length of the first mirror.

11. An optical communication assembly according to claim 1, wherein the first light-directing device comprises an optical wavelength grating.

12. An optical communication assembly according to claim 1, wherein the non-dispersive direction is substantially perpendicular to the dispersive direction.

13. An optical communication assembly according to claim 1, wherein the first light-directing is further configured to diverge the multiple wavelength channels in the non-dispersive direction, and the second light-directing device is configured to converge the multiple wavelength channels in the dispersive direction.

14. A method of modulating an optical signal, comprising:
   emitting an optical signal comprising multiple wavelength channels;
   dispersing the multiple wavelength channels in a dispersive direction;
   focusing the multiple wavelength channels in a non-dispersive direction; and
   focusing the multiple wavelength channels focused in the non-dispersive direction in the dispersive direction for projection onto the light modulating device.

15. A method according to claim 14, wherein the method of modulating an optical signal comprises a method of modulating an optical signal within a dynamic gain equalizer for projection onto a MEMs mirror array within the light modulating device.

16. A method according to claim 14, wherein dispersing the multiple wavelength channels along a dispersive axis further comprises dispersing multiple wavelength channels having a range of about 1528 nm to about 1610 nm.

17. A method according to claim 14, wherein focusing the multiple wavelength channels in non-dispersive and dispersive directions comprises focusing the multiple wavelength channels in non-dispersive and dispersive directions using respective first and second refracting devices.

18. A method according to claim 17, wherein the first refractive device is a first lens comprising a cylindrical convex curvature in the non-dispersive direction, and the second refractive device is a second lens comprising a cylindrical convex curvature in the dispersive direction.

19. A method according to claim 18, further comprising positioning the first lens between the second lens and an optical signal collimator emitting the optical signal.

20. A method according to claim 19, further comprising positioning the second lens at a focal length of the first lens.

21. A method according to claim 14, wherein focusing the multiple wavelength channels in non-dispersive and dispersive directions comprises focusing the multiple wavelength channels in non-dispersive and dispersive directions using respective first and second reflective devices.

22. A method according to claim 21, wherein the first reflective device is a first mirror comprising a cylindrical convex curvature in the non-dispersive direction, and the second reflective device is a second mirror comprising a cylindrical convex curvature in the dispersive direction.

23. A method according to claim 22, further comprising positioning the first mirror between the second mirror and an optical signal collimator emitting the optical signal.

24. A method according to claim 23, further comprising positioning the second mirror at a focal length of the first mirror.

25. A method according to claim 14, wherein dispersing the multiple wavelength channels in a dispersive direction comprises dispersing the multiple wavelength channels in a dispersive direction using an optical wavelength grating.

26. A method according to claim 14, wherein the non-dispersive direction is substantially perpendicular to the dispersive direction.

27. A method according to claim 14, wherein focusing further comprises converging the multiple wavelength channels in the dispersive direction, and diverging the multiple wavelength channels in the non-dispersive direction.

* * * * *